United States Patent [19]
Gebelein et al.

[11] Patent Number: 5,278,695
[45] Date of Patent: Jan. 11, 1994

[54] MAGNIFIER

[75] Inventors: Rolin J. Gebelein, Santa Cruz; Ronald E. Grubman, San Mateo, both of Calif.

[73] Assignee: Blue Sky Research, Inc., San Jose, Calif.

[21] Appl. No.: 771,522

[22] Filed: Oct. 4, 1991

[51] Int. Cl.$^5$ .................... G02B 17/00; G02B 13/00
[52] U.S. Cl. .................... 359/419; 359/730; 359/736; 359/744
[58] Field of Search ............. 350/445, 452, 608, 610; 359/419, 428, 730, 744, 736

[56] References Cited

U.S. PATENT DOCUMENTS

| | | | |
|---|---|---|---|
| 2,792,750 | 5/1957 | Nakken | 359/795 X |
| 3,809,462 | 5/1974 | Baumgardner et al. | 359/726 |
| 3,972,596 | 8/1976 | Baumgardner et al. | 350/452 X |
| 4,385,811 | 5/1983 | Nara | 359/434 |

Primary Examiner—Scott J. Sugarman

[57] ABSTRACT

An apparatus is provided for magnifying the image of distant objects which has the unique feature that, unlike the Galilean telescope, the magnification is largely determined by how far the eye is located from the apparatus. Furthermore, unlike the Loupe, objects to be viewed can be at any arbitrarily large distance from the apparatus. In addition, the apparatus does not require positioning of the eye at the exit pupil of the instrument; it does not require centering of the eye on the optic axis of the instrument; and it does not require refocusing for different object distances. Still, it provides erect, non-inverted images to the viewer. The includes a positive optical element defining an optic axis for the apparatus and having a positive focal length for converging an incoming bundle of rays of electromagnetic radiation. Also included is a negative optical element aligned with the optic axis and separated from said positive optical element by a distance d1, with the negative optical means having a negative focal length that is substantially equal in magnitude to the focal length of the positive optical means and having a focal point on the optic axis. The purpose of the negative optical element is for receiving the incoming bundle of rays of electromagnetic radiation from the positive optical element, and the condition is imposed on the positive and negative optical elements that their focal lengths be greater in magnitude than their separation d1. The apparatus further includes a housing for holding the positive and negative optical elements. Several embodiments are described which have folded optics for viewing objects to the rear which are particularly useful in vehicles.

40 Claims, 19 Drawing Sheets

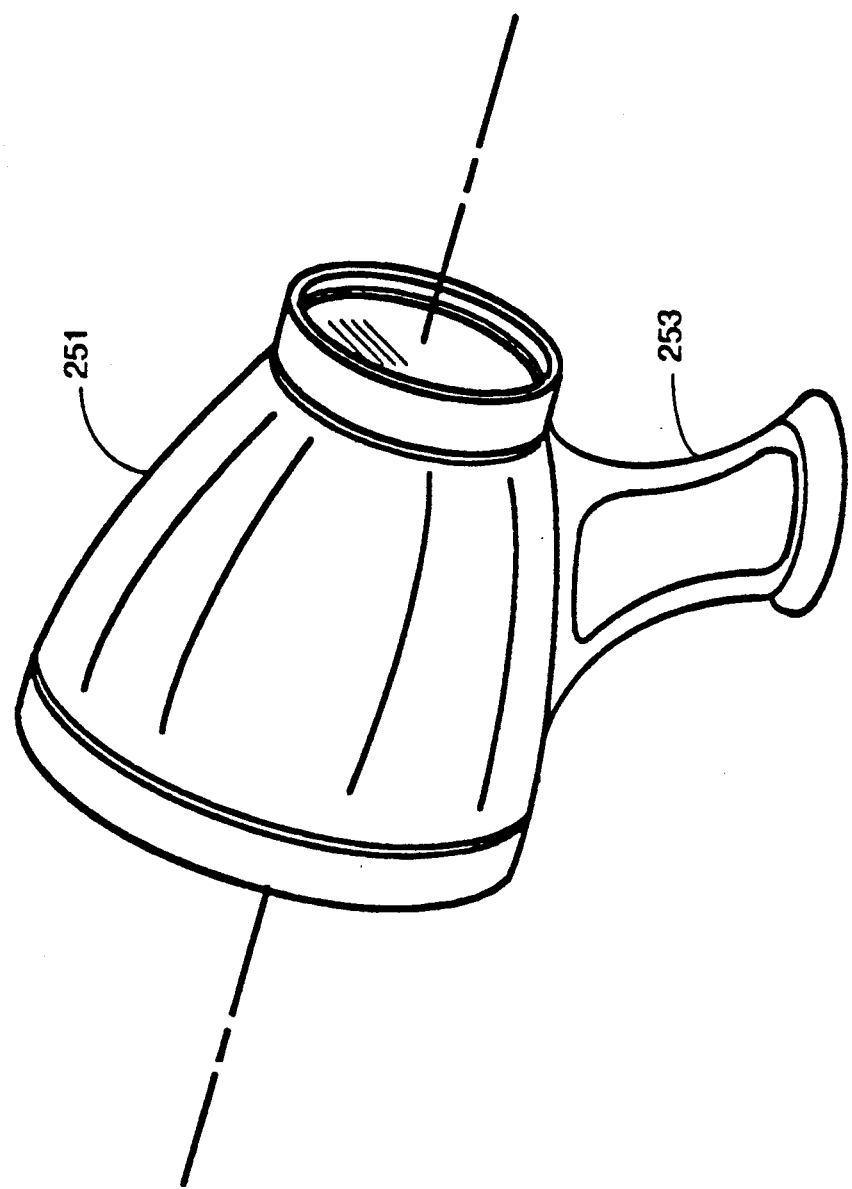

MAGNIFIER

CROSS-REFERENCE TO RELATED APPLICATION

This invention is related to U.S. patent application Ser. No. 07/615,476, filed Nov. 19, 1990, now abandoned, entitled VEHICULAR MIRROR MOUNT, by Donald Varner and Rolin Gebelein, said application incorporated herein by reference.

FIELD OF THE INVENTION

This invention relates to an optical magnifier for which the image always remains in focus regardless of the real object distance from the objective lens of the magnifier. Of particular importance are embodiments in which the optics of this new apparatus are folded, thus enabling one to make particular use of it for providing magnified images in the rear view mirror of a vehicle.

BACKGROUND OF THE INVENTION

In the art, magnification of distant objects is usually accomplished with telescopes, for example with a classical telescope such as that shown in FIG. 1. The objective lens forms a real, reduced image I of the object O. I' is the virtual image of I formed by the ocular. The image I' may be formed anywhere between the near and far points of the eye.

In practice, the objects examined by a telescope are at such large distances from the instrument that the image I is formed very nearly at the second focal point of the objective. Furthermore, if the image I' is at infinity, the image I is at the first focal point of the ocular. The distance between objective and ocular, or the optical length of the telescope, is therefore the sum of the focal lengths of objective and ocular, $f_1+f_2$.

The angular magnification of a telescope is defined as the ratio of the angle subtended at the eye by the final image I', to the angle subtended at the (unaided) eye by the object. As will be shown, this ratio may be expressed in terms of the focal lengths of objective and ocular. The shaded bundle of rays in FIG. 2 corresponds to that in FIG. 1, except that the object and the final image are both at infinity. The ray passing through $F_1$, the first focal point of the objective, and through $F_2'$, the second focal point of the ocular, has been emphasized. The object (not shown) subtends an angle $\theta$ at the objective and would subtend essentially the same angle at the unaided eye. Also, since the observer's eye is placed just to the right of the focal point $F_2'$, the angle subtended at the eye by the final image is very nearly equal to the angle $\theta'$. The distances ab and cd are equal to one another and to the height y' of the image I. Since both $\theta$ and $\theta'$ are small, they may be approximated by their tangents. It can be seen from the right triangles $F_1$ab and $F_2'$cd that $\theta=-y'/f_1$ and $\theta'=y'/f_2$. Hence, the magnification M is given by $$M=\theta'/\theta=-(y'/f_2)/(y'/f_1)=-f_1/f_2.$$

The angular magnification of a classical telescope is therefore equal to the ratio of the focal length of the objective to that of the ocular. The minus sign denotes an inverted image.

Although classical telescopes may be used with such a left for right inverted image without significant disadvantage for astronomical observations, it is desirable that a terrestrial telescope form an erect image. This may be accomplished by the insertion of an erecting lens or lens systems between the objective and ocular. The erecting lens simply serves to invert the image formed by the objective. That is the optical system of the spyglass. It has the disadvantage of requiring an unduly long tube, since four times the focal length of the erecting lens must be added to the sum of focal lengths of objective and ocular. Furthermore, classical telescopes typically have poor eye relief, e.g. about only an inch or two and the eye must be accurately centered on the telescope optical axis for viewing.

The problems of excess length and image inversion have been remedied with the introduction of the Galilean telescope, another form of the classical telescope which obeys the same magnification rule derived above. In the Galilean telescope, the ocular is a double concave lens as illustrated in FIG. 3, and the objective is a double convex lens as for the classical telescope described above. In the Galilean telescope, the objective is configured to focus an image at a point behind the ocular. Hence, there is a virtual object at a distance $x_2$ from the ocular. The distance between the lenses, $x_1+x_2=f(+)+f'(-)$, where $f(+)$ is the infinity focal length of the positive lens (objective), and $f'(-)$ is the infinity focal length (virtual) of the negative lens. The Galilean telescope is only in focus if $x_2=-f'(-)$ for real objects at infinity. The Galilean telescope must be refocused for observing objects not at infinity. With the Galilean telescope, the virtual image is erect, and the eye relief is as long as any arbitrary distance from the eye to the eye lens (i.e. ocular) of the Galilean telescope, but the eye must still be accurately centered. Positioning the eye at the exit pupil as necessary for the classical telescope or centering the eye on the instrument optical axis or refocusing is a significant limitation to employing any telescope while operating a moving automobile or other vehicle.

Another magnifier with which most people are familiar is the "loupe". A typical loupe is illustrated in FIG. 4. The loupe consists of only one positive lens and does produce erect virtual images that do not require accurate centering or positioning of the eye. However, the viewed object cannot be located at a long distance from the lens, since the object must be viewed inside of focus.

What is needed, especially for use in a moving vehicle, is a magnifier for which objects to be viewed can be at any arbitrarily large distance from the magnifier, that does not require accurate centering of the eye at the exit pupil of the instrument, that does not require centering of the eye on the optic axis of the instrument, that does not require refocusing, and that still provides erect, non-inverted images to the viewer.

SUMMARY OF THE INVENTION

In accordance with preferred embodiments of the invention, apparatus is provided for magnifying the image of distant objects which has the unique feature that, unlike the Galilean telescope, the magnification is largely determined by how far the eye is located from the apparatus. Furthermore, unlike the Loupe, objects to be viewed can be located at any arbitrarily large distance from the apparatus. In addition, the apparatus does not require positioning of the eye at the exit pupil of the instrument; it does not require centering of the eye on the optic axis of the instrument; and it does not require refocusing for different object distances. Still, it provides erect, non-inverted, magnified images to the viewer.

In accordance with the preferred embodiments, an apparatus for magnifying the appearance of a viewed object is provided which includes a positive optical element defining an opto-mechanical axis for the apparatus and having a positive focal length for converging an incoming bundle of rays of light. Also included is a negative optical element that lies on the opto-mechanical axis and that is separated from the positive optical element by a distance, say d, with the negative optical means having a negative focal length that is substantially equal in magnitude to (i.e. having the same absolute value as) the focal length of the positive optical means. The purpose of the negative optical element is for receiving the incoming bundle of rays of light from the positive and negative optical elements that their individual focal lengths be greater in magnitude than their separation d. The apparatus further includes a housing for holding the positive and negative optical elements. In the preferred mode, the positive optical element is a meniscus lens having positive power, and the negative optical element is a meniscus lens having negative power.

In other preferred embodiments, the opto-mechanical axis of the apparatus is folded between the positive and negative optical elements in order to decrease the lateral extent of the apparatus. Several embodiments are provided which use a single flat mirror or two flat mirrors for the fold. These folded applications are particularly useful for magnifying images in the rear-view mirror of vehicles. A further embodiment is provided where the rear-view mirror itself acts to fold the optic axis. In addition, an embodiment is provided wherein a mirror with positive power is used for the fold as well as to provide power.

Further, as a general concept, an apparatus is provided for viewing a magnified image of an object behind a vehicle when the vehicle has a rear-view mirror attached to it and oriented for the viewer to see the object while facing forward in the vehicle. The apparatus includes an optical magnifier for providing a magnified, erect, virtual image of the object and a connection element attached to the optical magnifier for holding the optical magnifier in a relationship relative to the rear-view mirror such that the magnified, erect, virtual image appears to the viewer in the rear-view mirror.

In another preferred embodiment, a magnifier is provided wherein the positive objective lens is an achromatic doublet. Again the focal length of the positive lens and the negative lens are approximately equal in magnitude and their separation is less than their focal lengths. This design makes it possible to achieve a much more compact design, which is useful not only in the rear view mirror configuration, but also as a monocular, as a gun sight, and also can be used to make binoculars. By folding the compact design along its optical axis between the two lenses, a compact magnifying rear view mirror can also be achieved.

BRIEF DESCRIPTION OF THE DRAWINGS

Shown in FIG. 1 is a typical classical telescope.

Shown in FIG. 2 is the classical telescope of FIG. 1 illustrating the magnification properties of the apparatus.

Figure 1:
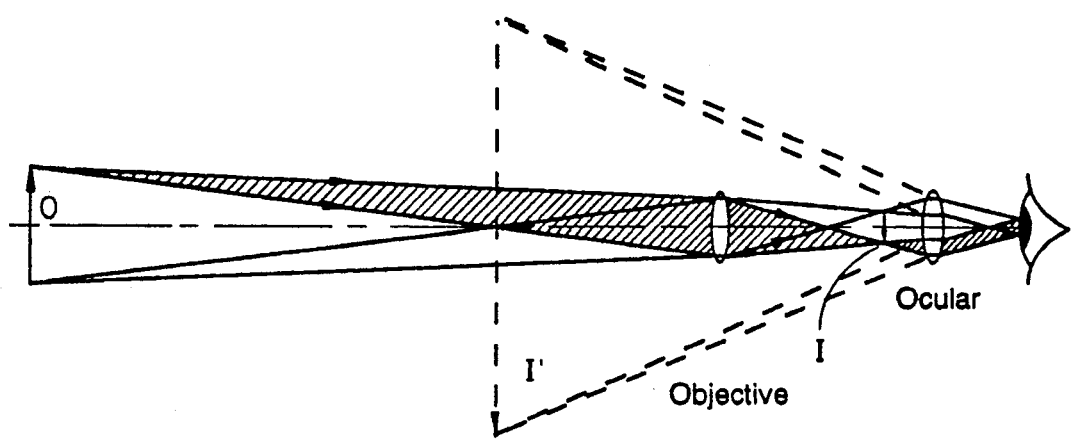
Figure 2:
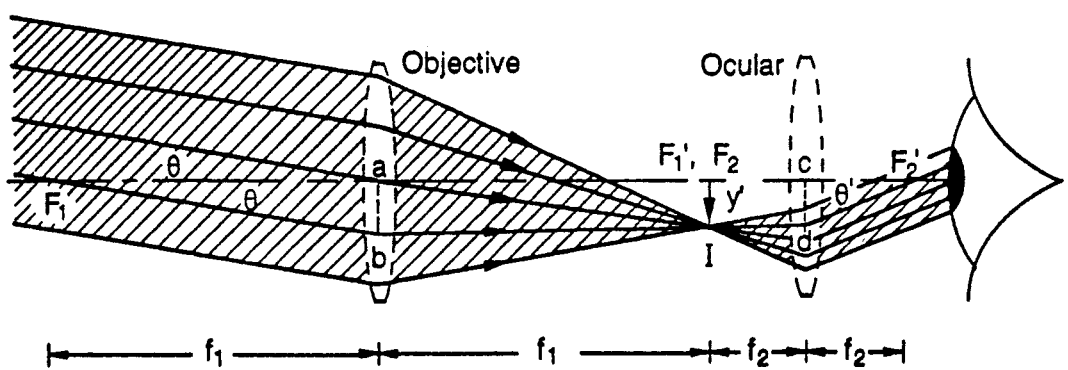
Figure 3:
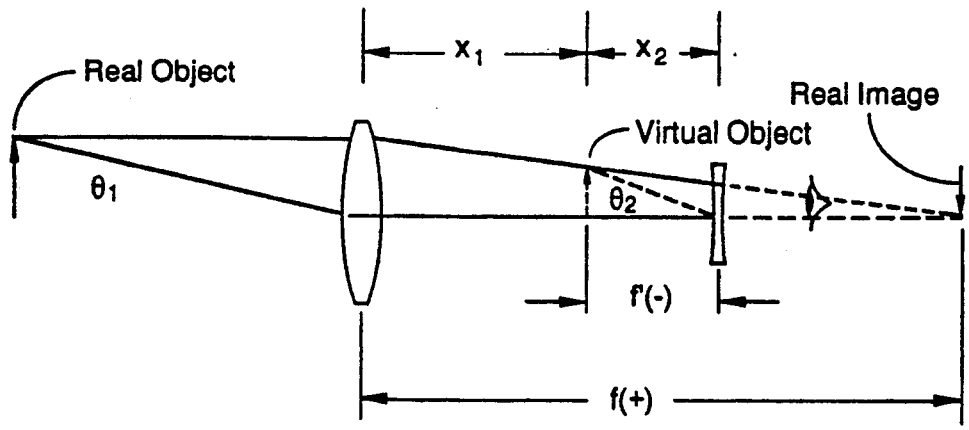

Shown in FIG. 3 is a Galilean telescope.

Figure 4:
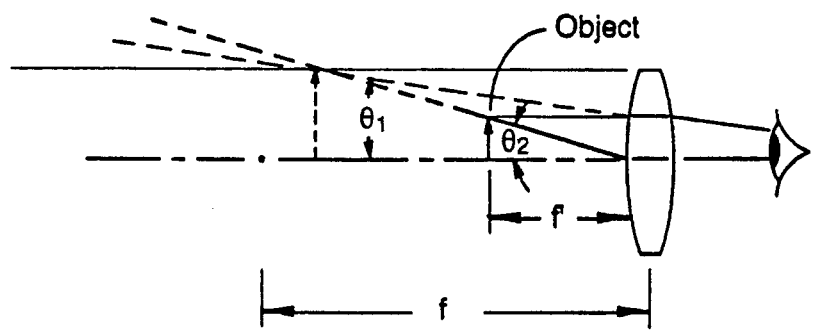

Shown in FIG. 4 is a typical magnifying glass, called a Loupe.

Figure 5:
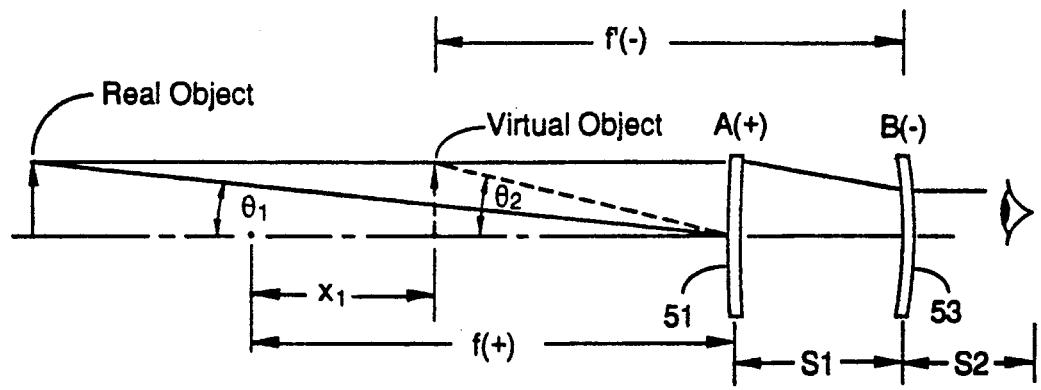

Shown in FIG. 5 is first preferred embodiment of the invention.

Figure 6C:
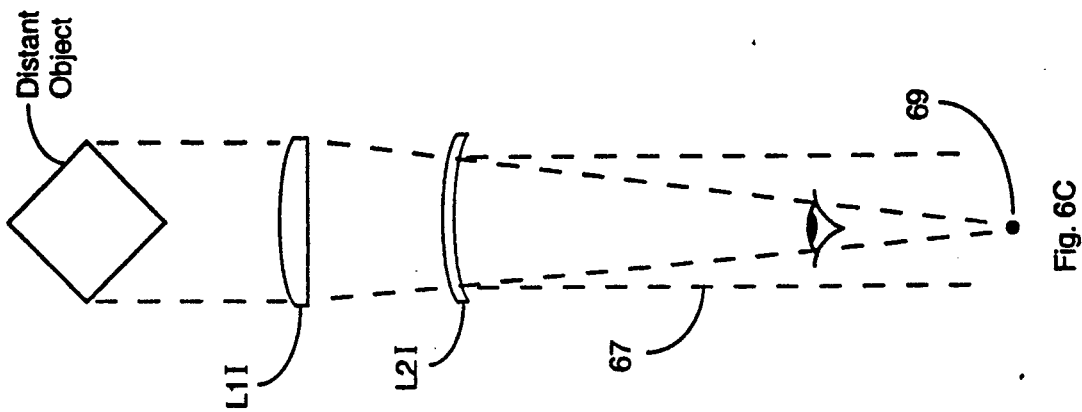
Figure 6B:
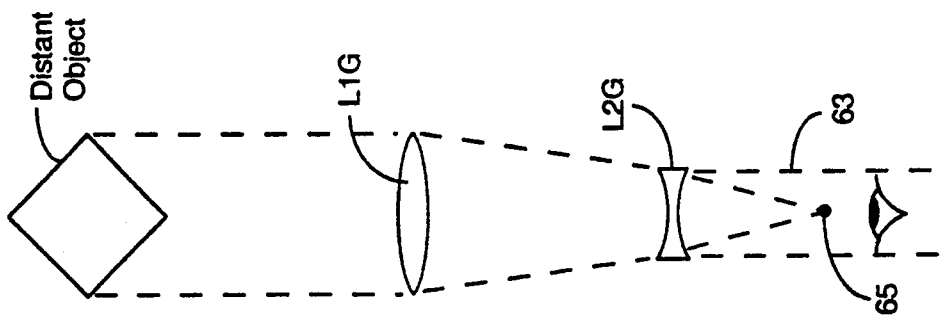
Figure 6A:
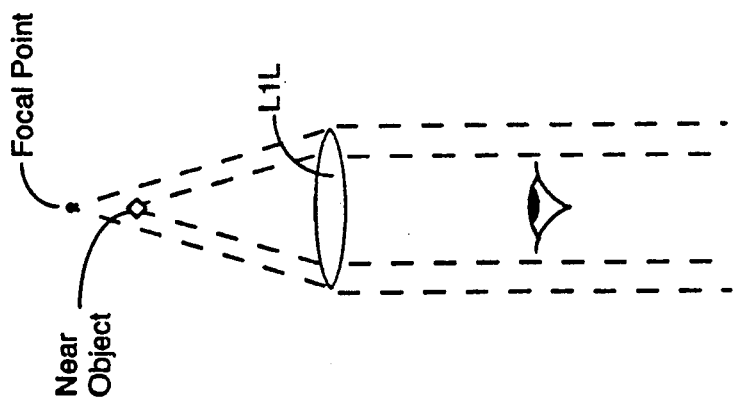

Shown in FIG. 6A, 6B, 6C is a comparison of the first preferred embodiment of the invention with a Galilean telescope and a Loupe.

Figure 7:
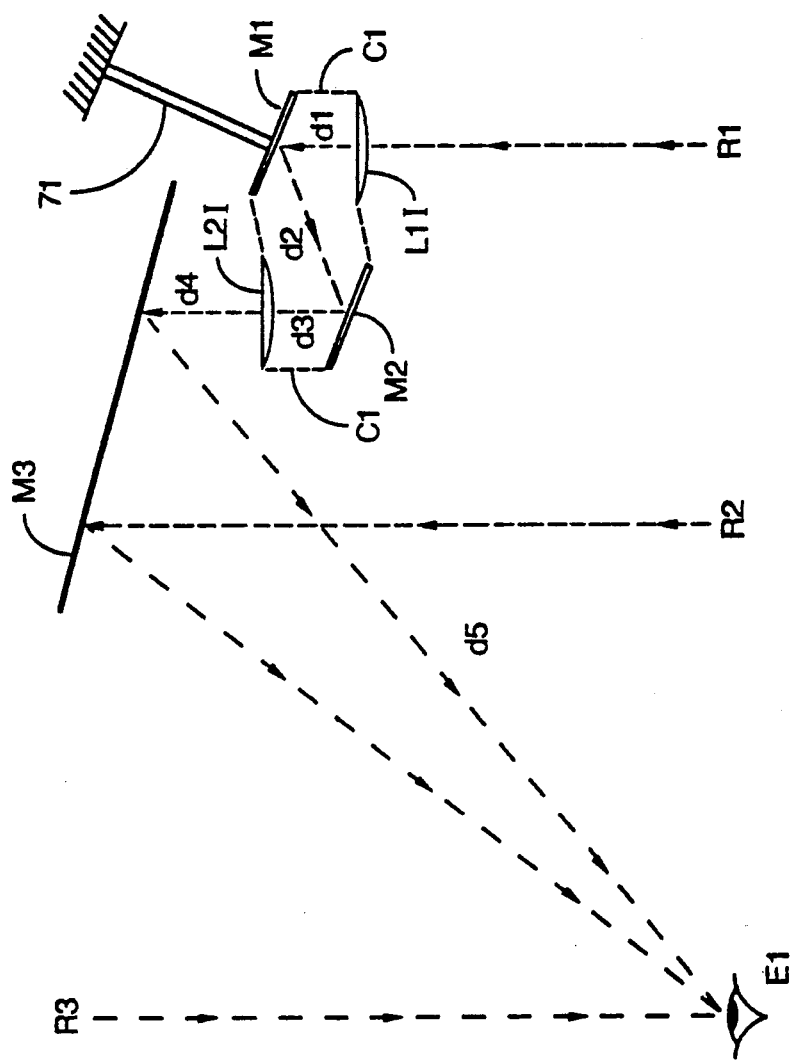

Shown in FIG. 7 is a first folded embodiment of the invention such as might be used in a motor vehicle.

Figure 8:
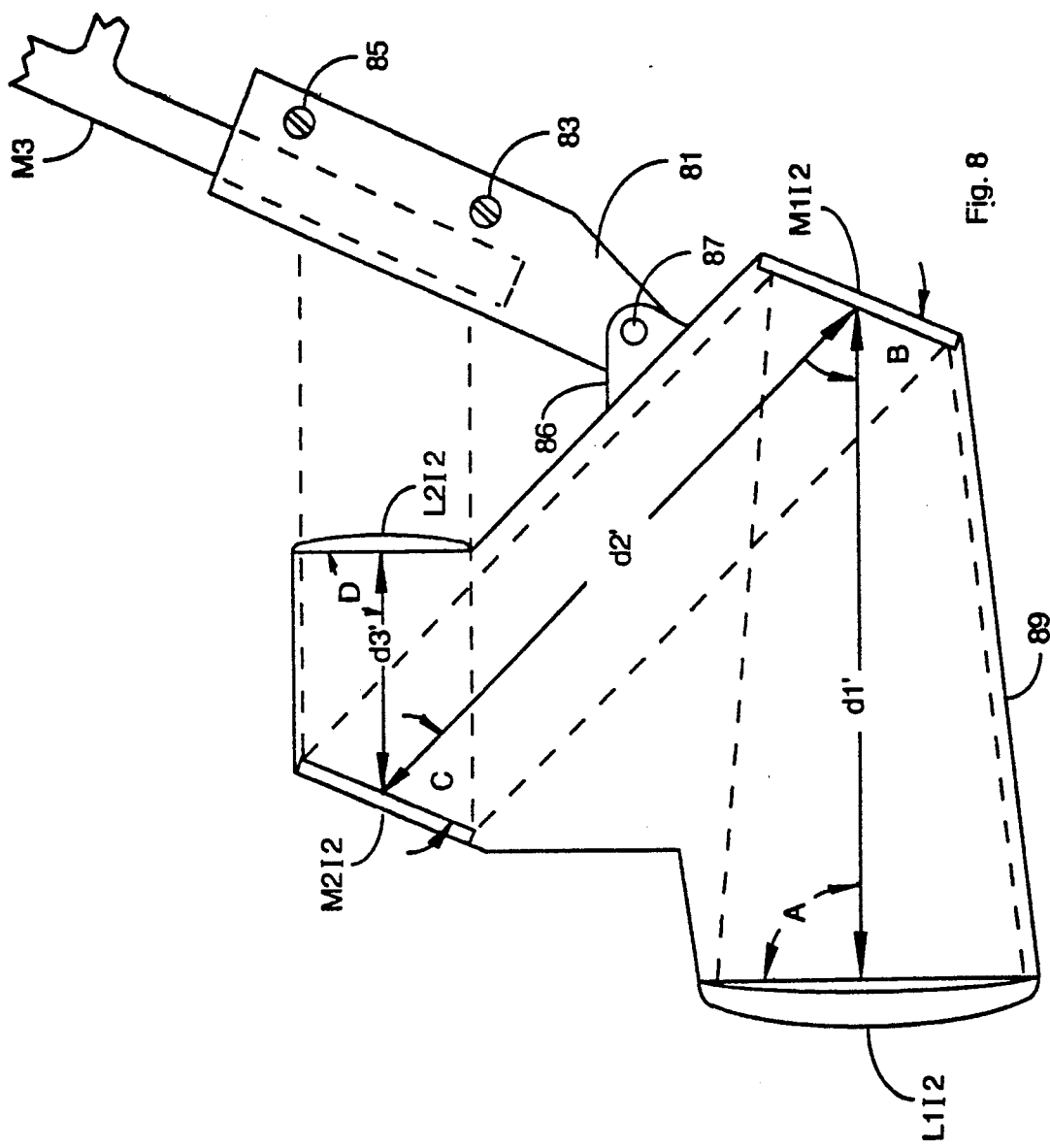

Shown in FIG. 8 is an alternative folded embodiment of the invention.

Figure 9:
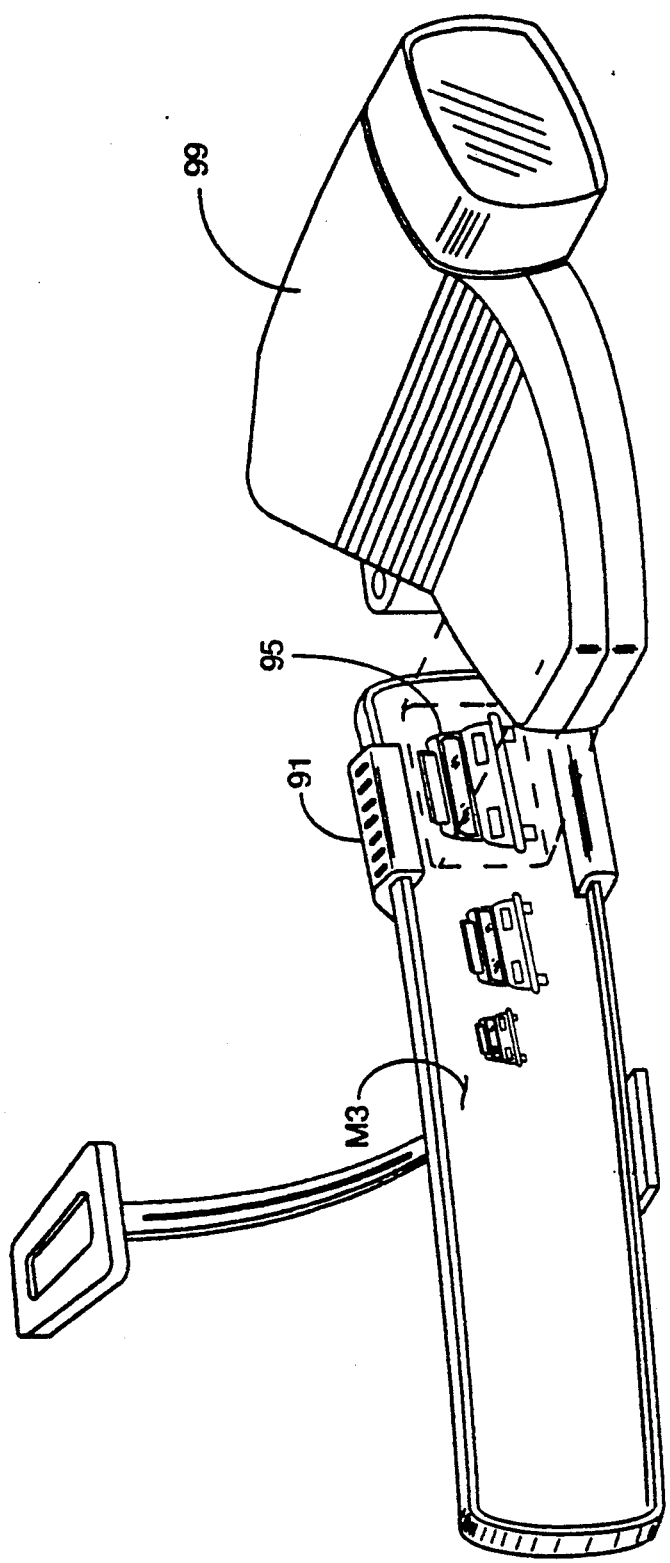

Shown in FIG. 9 is a perspective view of a folded embodiment of the invention.

Figure 10:
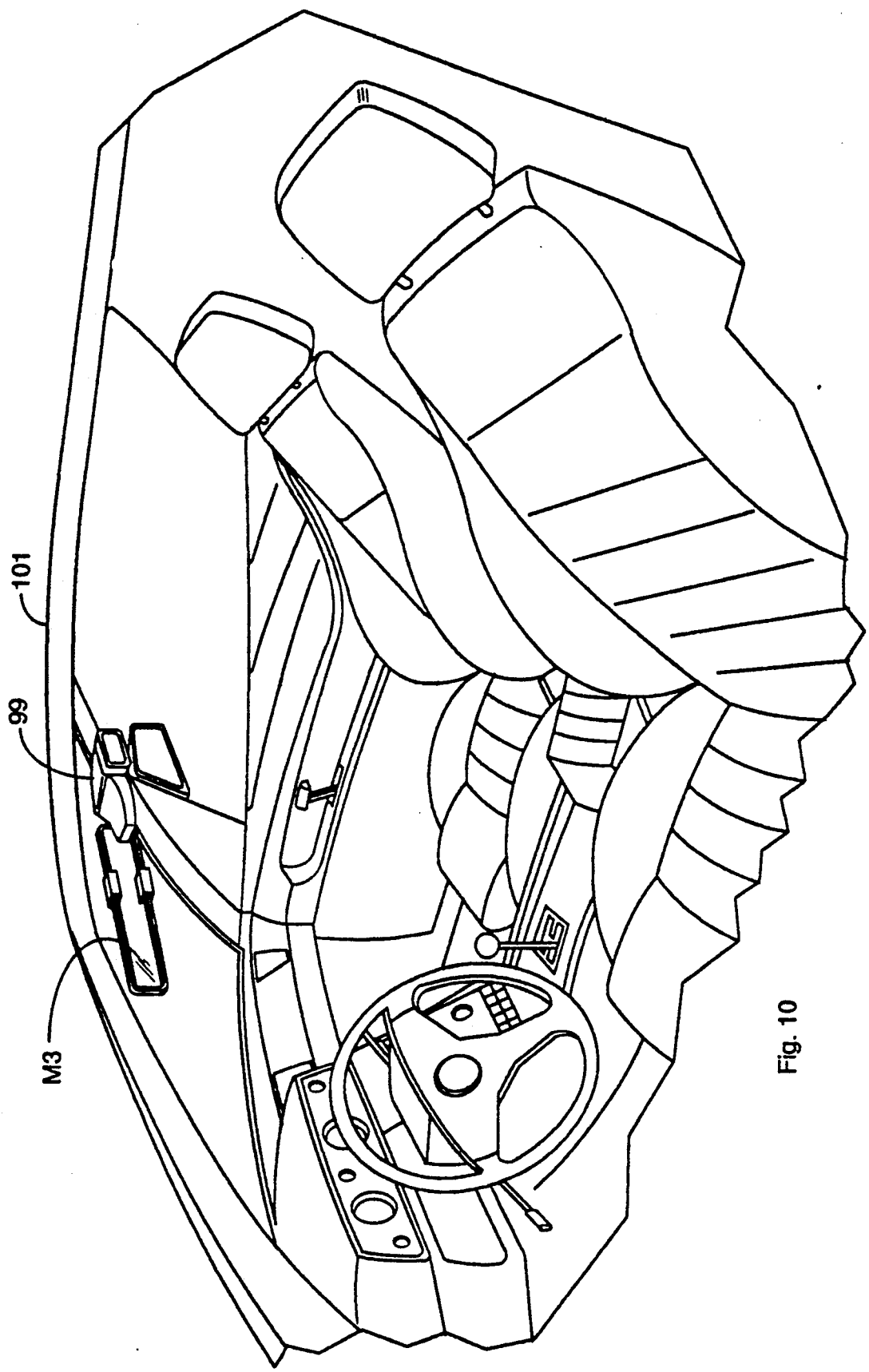

Shown in FIG. 10 is a perspective view of the embodiment of FIG. 9 as it would appear in an automobile.

Figure 11:
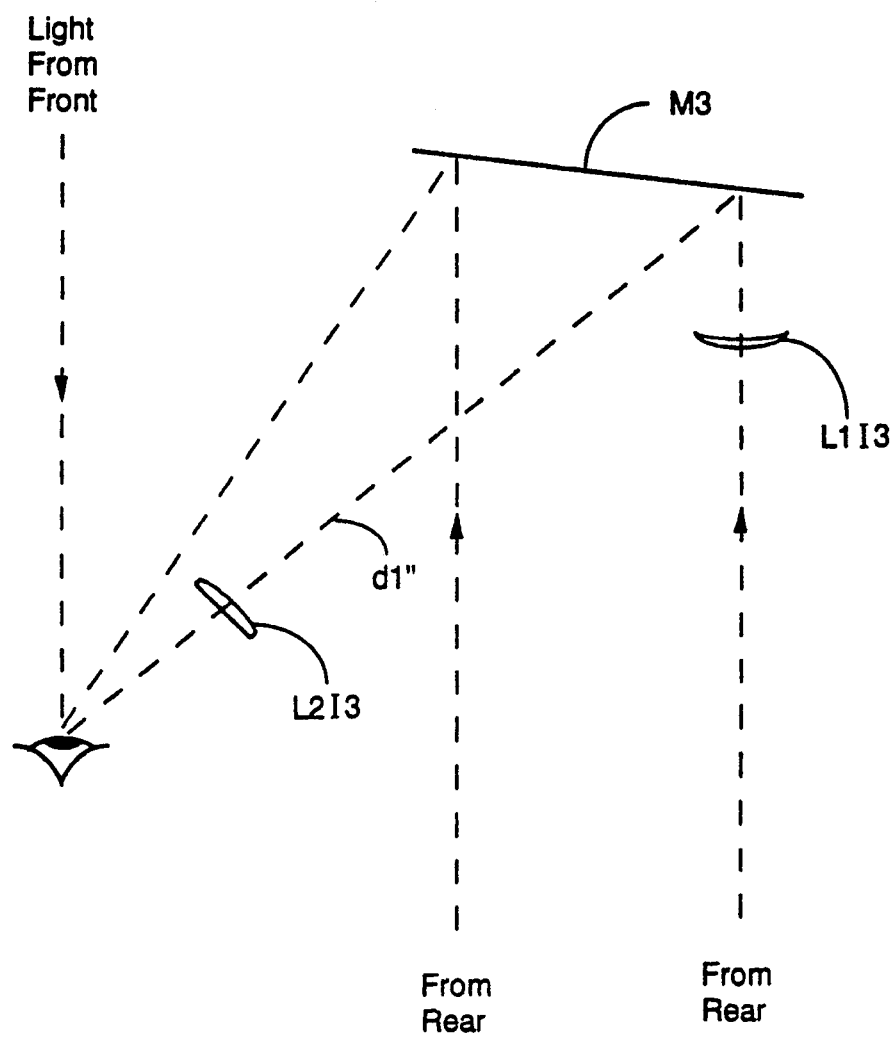

Shown in FIG. 11 is a top view of an alternative preferred embodiment of the invention which has only one fold and uses the rear-view mirror of a vehicle for that fold and employs an eye lens that is relatively near the eye.

Figure 12:
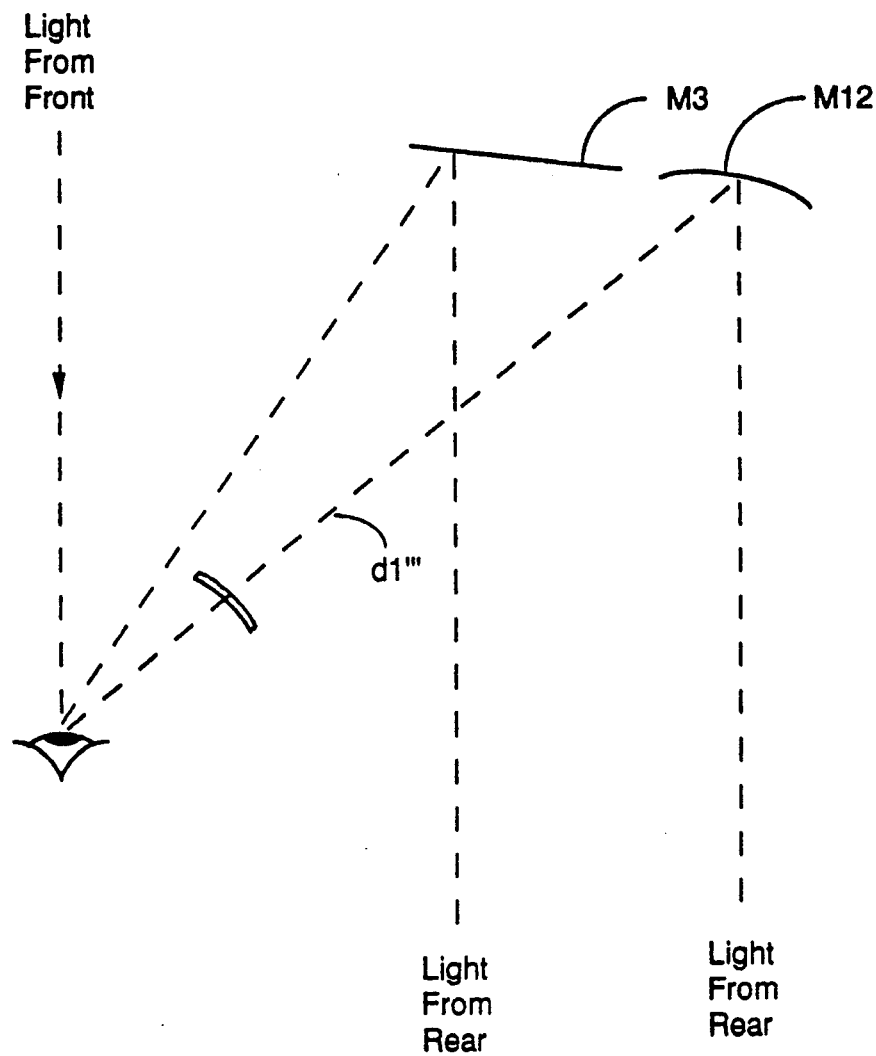

Shown in FIG. 12 is a top view of an alternative preferred embodiment of the invention which also has only one fold, but uses a concave mirror both for the fold and for power, and uses an eye lens that is relatively near the eye.

Figure 13A:
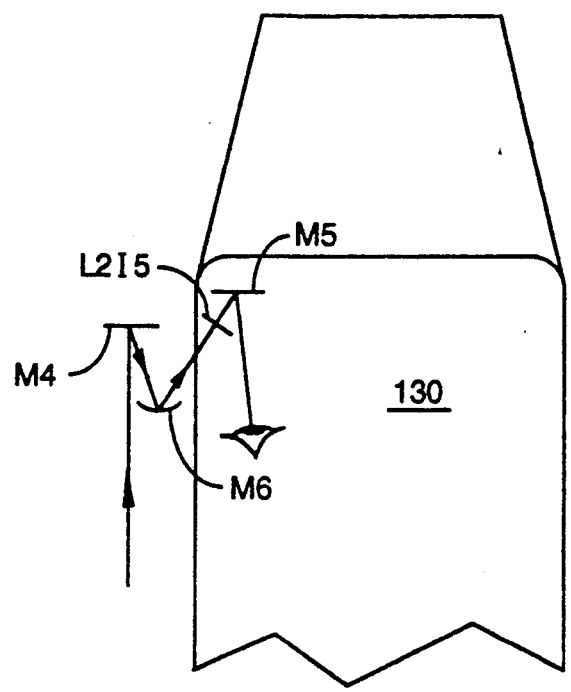

Shown in FIG. 13A is an alternative embodiment that is useful for rear-view mirrors that are located outside of the vehicle.

Figure 13B:
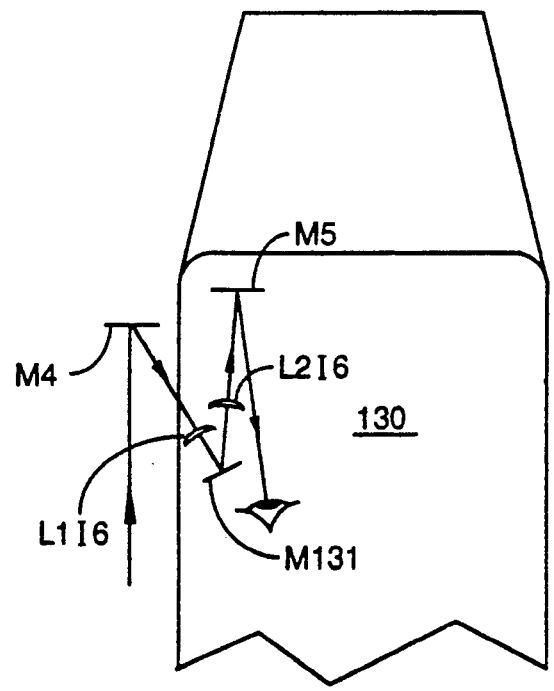

Shown in FIG. 13B is a second embodiment that is useful for rear-view mirros that are located outside of the vehicle.

Figure 14:
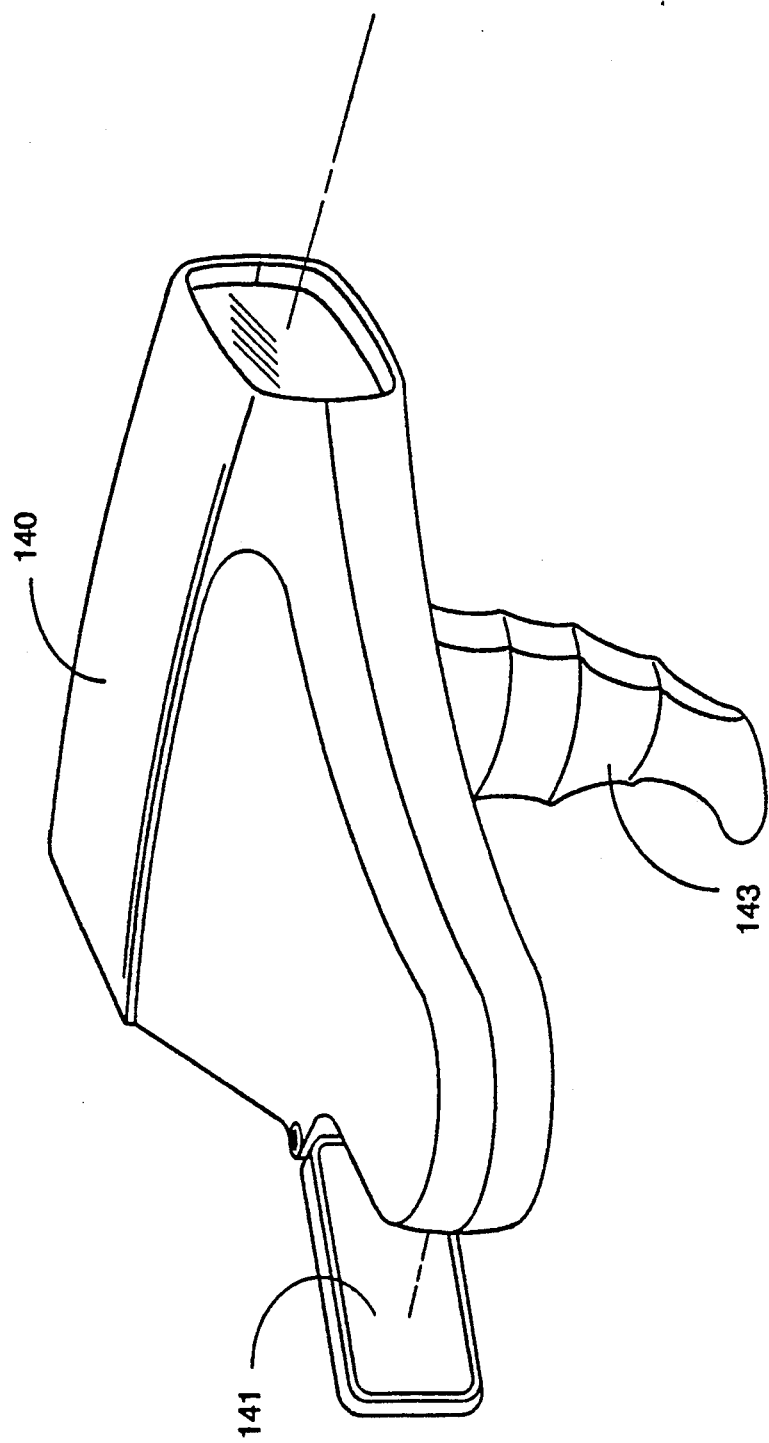

Shown in FIG. 14 is an alternative embodiment that is a hand carried magnifier for viewing to the rear.

Figure 15A:
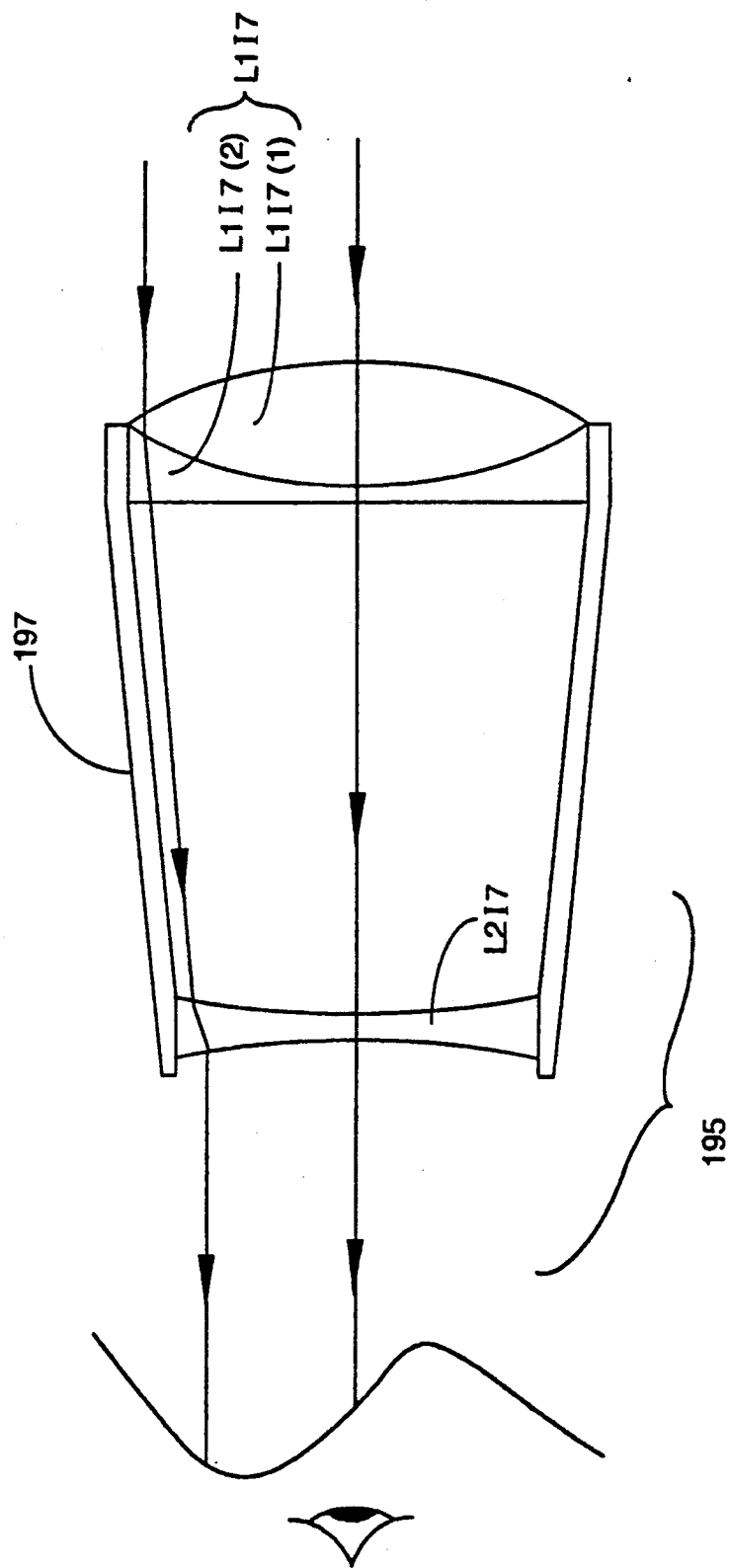

Shown in FIG. 15(a) is a cross-sectional view of a magnifier according to the invention.

Figure 15B:
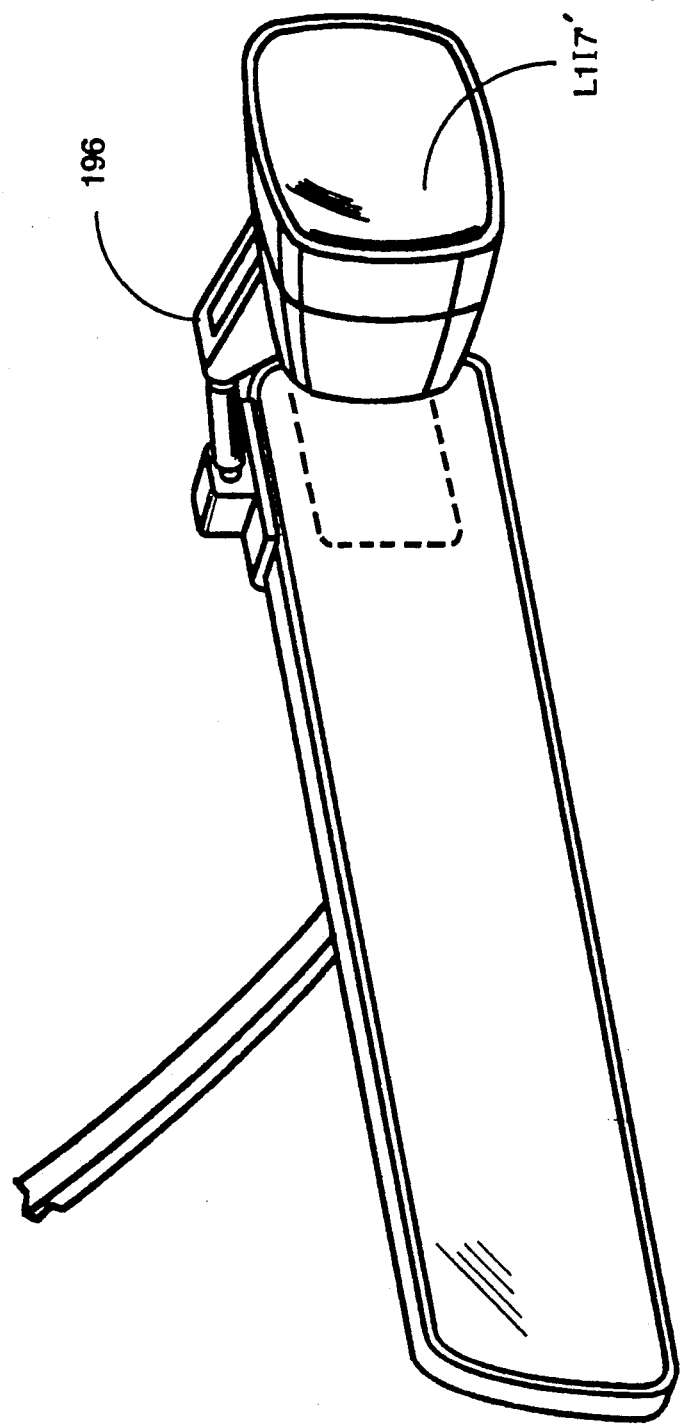

Shown in FIG. 15(b) is a typical mounting arrangement for the embodiment of FIG. 15(a).

Figure 16:
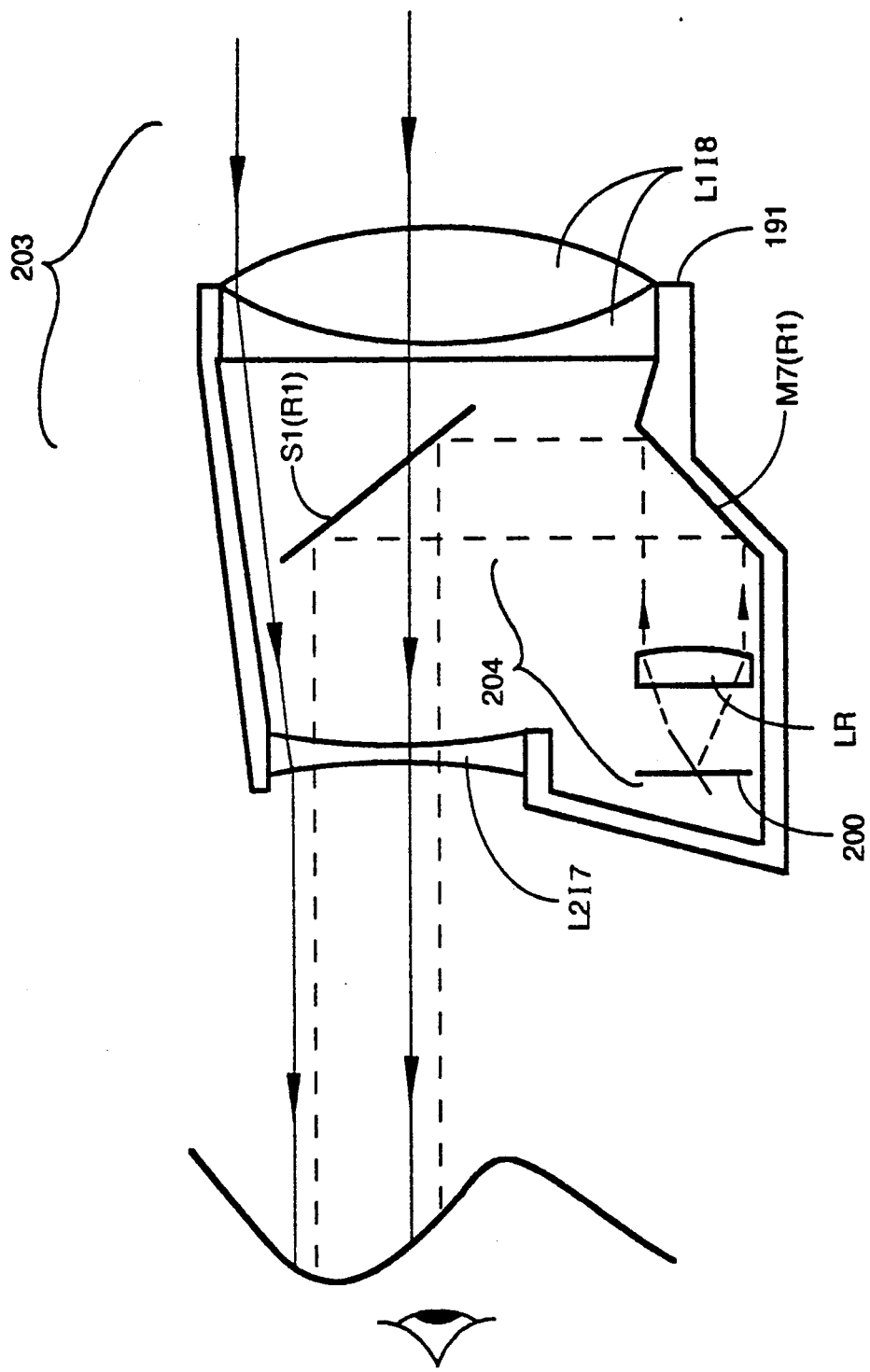

Shown in FIG. 16 is a cross-sectional view of a magnifier according to the invention that is particularly adapted for use on rifles and hand-guns.

Figure 17A:
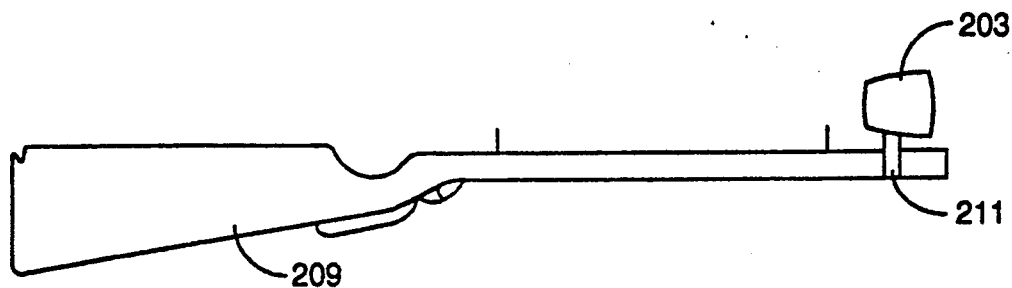
Figure 17B:
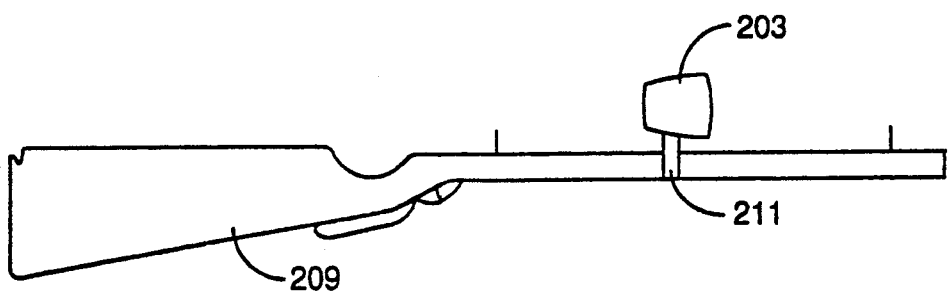
Figure 17C:
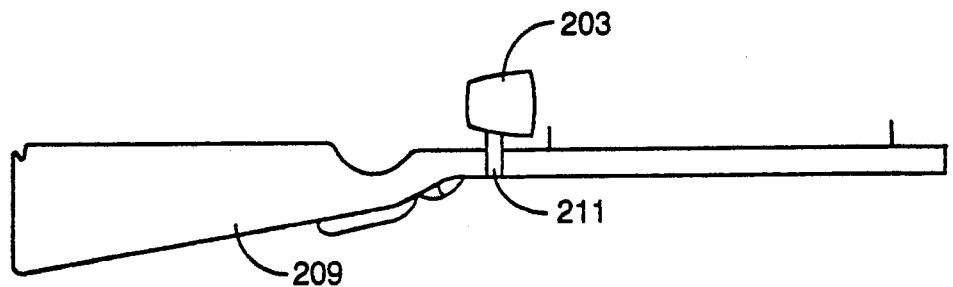

Shown in FIG. 17(a), FIG. 17(b), and FIG. 17(c) are various mounting positions on a rifle for a magnifier according to the invention.

Figure 18:
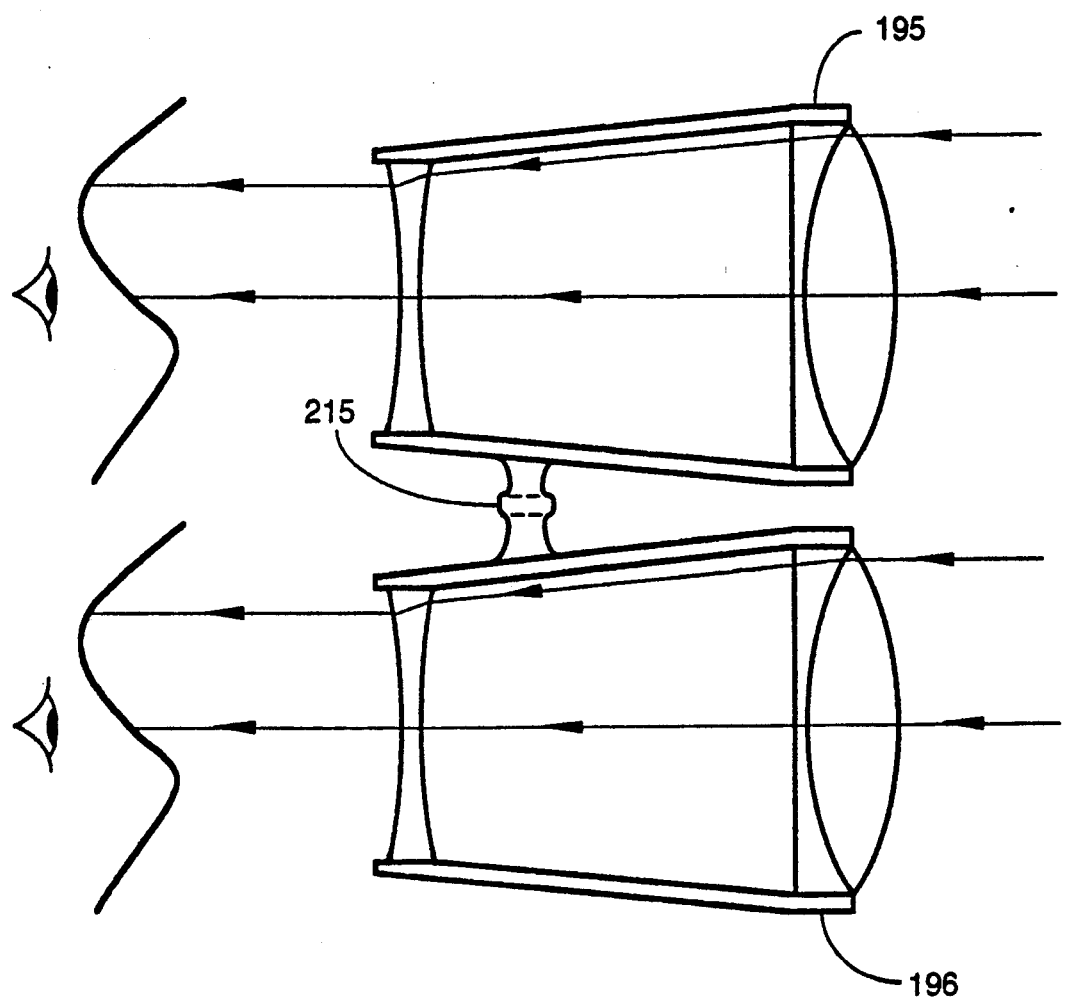

Shown in FIG. 18 is a pair binoculars according to the invention.

Figure 19:
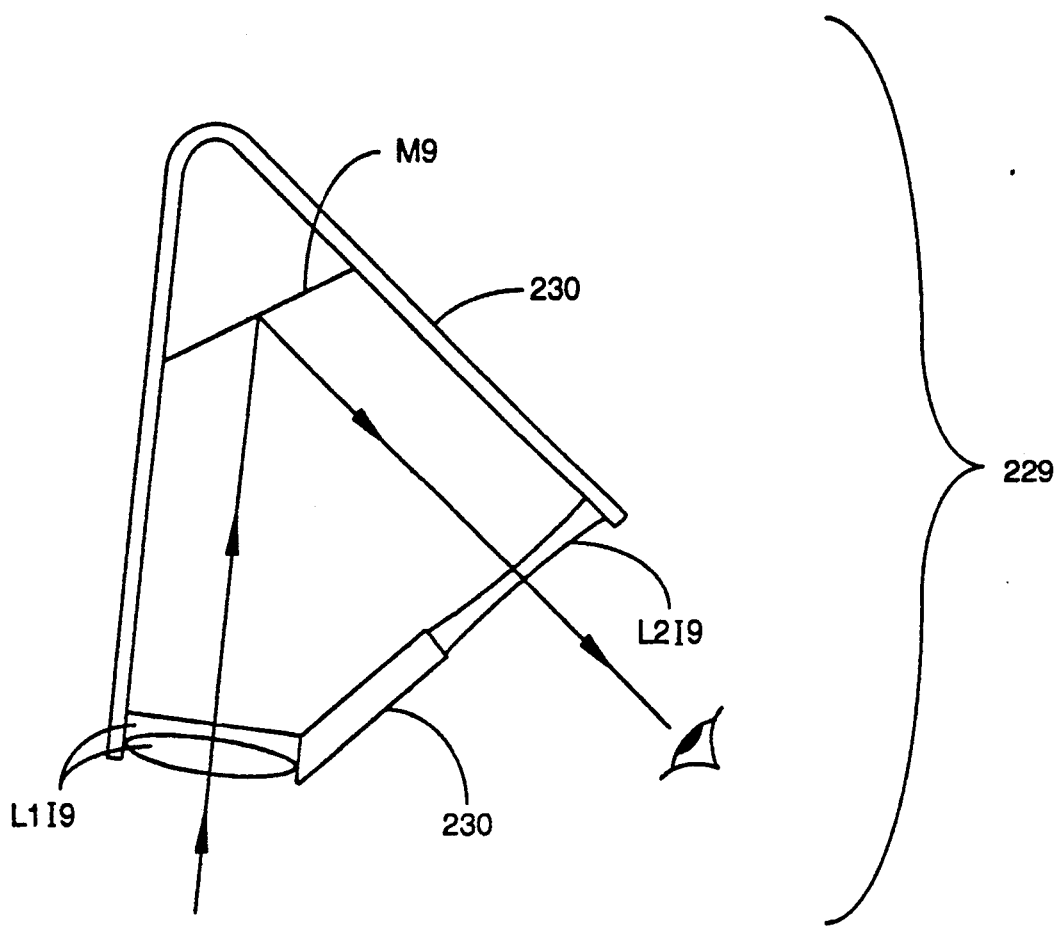

Shown in FIG. 19 is a compact magnifying rear view mirror according to the invention.

Figure 20:
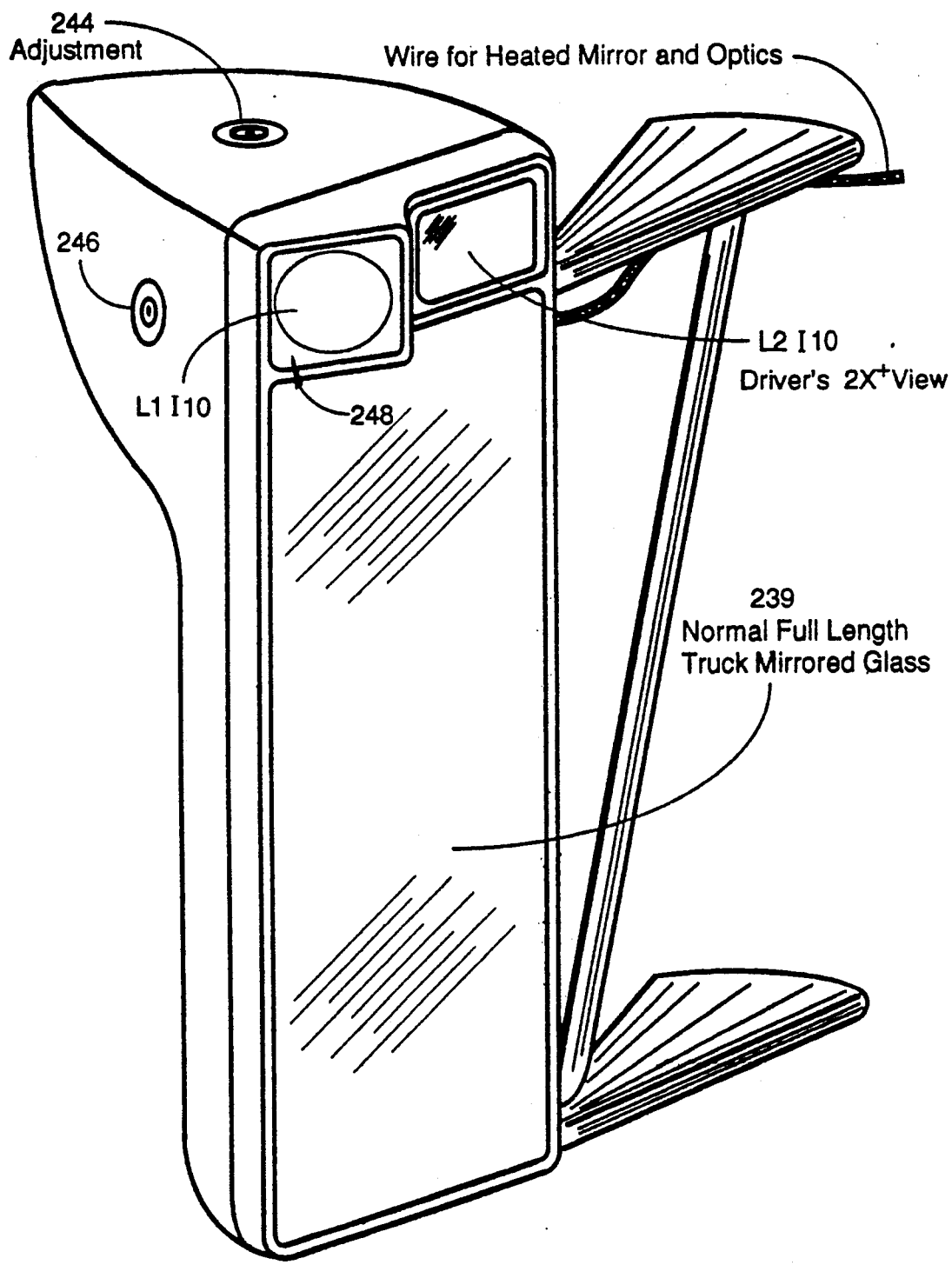

Shown in FIG. 20 is a truck mirror with the rear view mirror of FIG. 19 integrated therewith.

Shown in FIG. 21 is a magnifier according to the invention which is especially adapted for being hand held.

DESCRIPTION OF THE PREFERRED EMBODIMENTS

Shown in FIG. 5 is a first preferred embodiment of the invention in unfolded form. The apparatus is made up of an objective lens 51 having positive power and an eye lens 53 having negative power. In the preferred mode, objective lens 51 and eye lens 53 are ordinary spherical ophthalmic (meniscus) lenses, typically constructed of Crown Glass or plastic. Those skilled in the art, however, will appreciate that aspheric lenses could also be used in order to reduce distortion. For this example, lens 51 has been chosen to have a positive power of 0.75 Diopters (52.36 inches or 1.33 meters) and lens 53 has been chosen to have a negative power of −0.75 Diopters, and in general the lenses are chosen to have approximately equal and opposite powers. The distance s1 between the lenses has been chosen as 10 inches and the distance s2 from lens 53 to the eye has been chosen as 22 inches, so that the objective lens and the eye lens are placed such that the eye is always inside focus of the objective lens.

The focal length of this first preferred embodiment can be calculated as follows using the lens maker's formula:

$$FL = f51 * f53 / (f51 + f53 - D)$$

where f51 and f53 are the focal lengths of lenses 51 and 53, and D is the distance between the lenses. In this example D=10 inches, or 4 Diopters. Substituting into the above formula, one calculates that the focal length of the apparatus as FL=7.11 meters, an exceedingly long focal length. A further important point is that since the focal lengths of the two lenses are equal and opposite in sign, the combined focal length of the apparatus is solely determined by the separation of the lenses. The magnification of the apparatus can be estimated simply as the positive contribution due to the positive objective lens summed with the negative contribution due to the negative eye lens. In this example, an approximation of the contribution of each element can be made as the ratio of its focal length to the distance from its focal point to the eye, because the elements are each used to obtain virtual magnification:

$$M(51) = f51/(f51 - s1 - s2) = 1.33/(1.33 - 0.88) = 2.5;$$

$$M(53) = -f53/(f53 - s2) = -1.33/(1.33 + 0.55) = -0.707;$$

and $$M(1) = M(51) + M(53) = 1.80,$$

where M(51) and M(53), are the magnifications of lenses 51 and 53 respectively, and M(1) is the total magnification of the first preferred embodiment. Here, it is apparent that the magnification is very strongly controlled by the distance of the eye from the objective lens, the farther away the eye is from the objective lens the larger the magnification. This result is in stark contrast to the typical Galilean telescope, since as indicated earlier the magnification in that case is the same as for a classical telescope, i.e. merely the ratio of the focal lengths of the positive and negative lenses. If the focal lengths of a Galilean telescope were equal in magnitude, the "magnification" would be 1, i.e. there would be no magnification. Furthermore, in the Galilean case, the magnification has absolutely nothing to do with the location of the eye relative to the objective lens.

Another important feature of the invention is its eye accomodation, i.e. the ability of the eye to focus in combination with the apparatus. To illustrate that feature, the focal length of the magnifier/eye combined systems will now be compared with the focal length of the eye alone. Using the lens maker's formula to compute the combined focal length, one obtains:

$$FL_{combo} = f_m f_{eye} / (f_m + f_{eye} - d),$$

where $f_m$ is the focal length of the magnifier (7.11 in this example), $f_{eye}$ is the focal length of the eye, and d is the distance from the eye to the magnifier. In practice, the focal length of the eye is about 1 inch (1/40 of a meter), and a typical distance d is about 27 inches (as will be understood when the folded rear vision embodiment is described). This yields a focal length of the combination of 1.10 inches, which is only 10% larger than for the eye alone. Those skilled in the art will realize that a wide range of eyes can easily accommodate this very small change in focal length.

Before proceeding with descriptions of additional embodiments of the invention, it is useful to review some of the important differences between the present invention and the Galilean telescope. The Galilean telescope is comprised of a positive objective lens element and a negative eye lens element, with these elements separated such that their foci are coincident, i.e. the infinity focal point of the positive lens is made to coincide with the (virtual) infinity focal point of the negative eye lens in order to obtain infinity focus with the Galilean telescope. Other objects may be brought into focus but the separation distance between the positive and negative lens elements must be changed (increased) to accomplish focus of nearer objects, and accurate focusing of Galilean telescopes for near objects is actually quite sensitive to proper separation and placement of the lenses. The magnifying power of the Galilean telescope is determined by the ratio of these focal distances (just as in the classical case). Hence, for any magnification other than unity, the focal length of the objective cannot be equal in magnitude to the focal length of the eye lens.

For the present invention however, the positive objective lens and the negative eye lens are of equal (or nearly so), but opposite powers, and the magnifying power of the invention is largely determined by the distance of the eye from the objective lens and has some sensitivity to the separation of the lens elements. A surprising result of this combination is that objects are always simultaneously in focus regardless of their distance and regardless of the separation of the lens elements. The foci of the elements do not thus coincide; in fact, the foci are separated by a distance exactly equal to the (arbitrarily) chosen separation of the lens elements, and the optical power (and focal length) of the telescope may be arbitrarily selected by simply varying the separation of the lens elements while keeping the eye at a fixed location relative to the objective lens, or by varying the distance of the eye from the device, or by varying both distances simultaneously. Furthermore, varying these distances can be done while viewing through the instrument, since all objects at all distances remain continuously in focus. This remarkable result is unique to this invention.

Another useful comparison relates to focal length. Application of the lensmaker' formula to calculate the focal length of a Galilean telescope having equal and opposite power lenses yields the result that the focal length is infinity (i.e. the Galilean would be afocal). However, as can be seen from the equations above, application of the lensmakers formula to the present invention yields the completely different result that the focal length, $F.L. = f^2/x$, where f is the magnitude of the focal length of either element, and x is the separation between the elements. Hence, for even moderate changes in the separation of the objective lens and the eye lens, focusing is not very sensitive to the magnitude of x.

Another important feature of the invention is that the objective lens and the eye lens are placed such that the eye is always well inside the focus of the objective lens. This is quite different from the Galilean telescope where the focal point of the objective is always in front of the eye. It is this unique feature of the invention that yields the surprising result that the eye need not be accurately centered for easy observation. As a practical matter, the optic axis of the apparatus is determined by the eye and the center of curvature of the objective lens. The objective lens and the eye lens merely form an opto-mechanical axis of the apparatus. Hence, the eye need hardly be centered at all.

A further comparison of the optical differences between the Loupe, the Galilean telescope, and the magnifier of the invention is illustrated in FIGS. 6A, 6B, and 6C. As shown in 6A which corresponds to a Loupe, a near object is magnified by an objective L1L such that a slightly divergent beam 61 is directed into the eye. For the Galilean telescope shown in FIG. 6B, objective lens L2G alone has a focal point 65 in front of the observers eye, and an afocal beam 63 is directed into the eye from the combination of the objective L1G and eye lens L2G. For a magnifier according to the invention, objective L1I alone has a focal point 69 behind the observers eye and the combination of the objective and eye lens L2I directs a slightly convergent beam 67 into the eye. Furthermore, the eye lens L2I has a focal point in front of the objective, i.e. a virtual image is provided in front of the objective and inside focus of the objective.

Shown in FIG. 7 is a first folded embodiment of the invention as might be used in a vehicle such as an automobile to look toward the rear while driving. In this embodiment, the lenses are as described before for the unfolded case: lens L1I is the objective lens, and lens L2I is the eye lens. This embodiment also includes, however, a mirror M1, a mirror M2, a case C1 in which to mount the lenses and mirrors, and a mounting system 71. In the preferred mode, the lenses are arranged so as to be parallel to each other and are typically oriented by the case and mounting system such that the optic axis is substantially parallel to the long axis of the vehicle. The mirrors are arranged parallel to each other and are oriented relative to the lenses such that a ray entering the instrument on the optic axis through lens L1I will leave the apparatus through lens L2I on the optic axis on a path parallel to its entrance path. The purpose of the mounting system is not only to hold the instrument with its optic axis substantially parallel to the long axis of the vehicle, but also to hold it in a stable relationship relative to the rear-view mirror of the vehicle once the driver has adjusted the apparatus to suit his needs. In practice, mounting system 71 has seen wide variation, e.g. from a simple post and screw assembly for attaching the instrument to the roof of the vehicle, to a gooseneck with a clamp for attachment to the rear-view mirror post itself, to a clamp and joint assembly for attaching directly to the rear-view mirror. Other types of mounts could, of course, also be used, such as attaching to the windshield or the dashboard.

The center-to-center distance between lens L1I and mirror M1 is represented by d1, the center-to-center distance between mirrors M1 and M1 is represented by d2, and the center-to center distance between mirror M2 and lens L2I is represented by d3. In FIG. 7, E1 represents the driver's eye. R1 and R2 represent rays from an object behind the driver and R3 represents a ray from ahead. M3 is a typical rear-view mirror in a automobile. As illustrated, ray R1 is first refracted by lens L1I. Then it traverses distance d1 and is reflected by mirror M1. It then traverses distance d2, is reflected by mirror M2, then traverses distance d3, and is refracted by lens L2I. It then traverses a distance d4 from lens L2I to rear view mirror M3, and then traverses a distance d5 between the rear-view mirror M3 and the driver's eye. The following table provides the details of the various distances and elements:

TABLE 1

| element | power | diameter/dimension |
|---------|-------|--------------------|
| L1I | 0.75D | 70 mm |
| L2I | −0.75D | 40 mm |
| M1 | 0 | 75 mm |
| M2 | 0 | 50 mm |
| d1 | | 4.0 in. |
| d2 | | 4.0 in. |
| d3 | | 2.0 in. |
| d4 | | 2.0 in. |

Shown in FIG. 8 is a slight modification of the first folded embodiment described above. This figure, which is substantially to scale, shows in more detail the relationship between the various elements and the effect of the elements on a light bundle entering the instrument. A case 89 holds an objective lens L1I2, a front silvered mirror M1I2 oriented at an angle B relative to the optic axis, a front silvered mirror M2I2 oriented at an angle C relative to the optic axis, and an eye lens L2I2. The light bundle is illustrated by the dotted lines inside the case 89. The separations of the various elements along the optic axis are designated by d1', d2', and d3'. The case has a flange 86 whereby it is attached by a pin 87 and ball joint system (not shown) to a clamp 81. Clamp 81 is used to clamp the apparatus onto rear view mirror M3 by two screws 83 and 85. It is useful to note that, in general, the case needs to be oriented such that the optic axis is substantially horizontal. In most cases, this means that the pin 87 should not be constrained to be only vertical, since often the normal to the rear view mirror has a downward component so that light is directed into the driver's eyes. The following table gives the various specifications of the elements described above:

TABLE 2

| element | power | diameter/dimension |
|---------|-------|--------------------|
| L1I2 | 0.75D | 2.5 in. |
| L2I2 | −0.75D | 1.25 in. |
| M1I2 | 0 | 2.0 in. |
| M2I2 | 0 | 1.5 in. |
| d1' | | 5.5 in. |
| d2' | | 5.5 in. |
| d3' | | 2.0 in. |
| A | | 90 degrees |
| B | | 67 degrees |
| C | | 67 degrees |
| D | | 90 degrees |

Although angle D is chosen to be 90 degrees in this example, in practice angle D may be altered as much as ±15 degrees or more to thwart unwanted reflections of stray light from entering the eye. In general, this has been found to enhance image contrast with only minor distortion.

Shown in FIG. 9 is a perspective view of the embodiment of FIG. 8 having lenses that are squared off for appearance purposes. A case 99 holding the lenses is held in alignment with the rear-view mirror M3 by means of a clamp 91. Illustrated in the rear-view mirror is a magnified image of a car 95.

FIG. 10 shows a perspective view of the embodiment of FIG. 9 as it looks in an automobile 101.

FIG. 11 shows a top view of another embodiment of the invention which has only one fold and uses the rear view mirror itself for that fold. In this embodiment, an objective lens L1I3 directs light from the rear onto rear view mirror M3, which is then directed toward an eye lens L2I3. The separation between the objective lens and the eye lens is d1'', and is chosen as 22 inches along the optic axis as in the first embodiment. Lenses L1I3 and L2I3 are again of equal and opposite focal lengths, L1I3 being 0.875 Diopters and L2I3 being −0.875 Diopters. A typical size for lens L1I3 is again 70 mm diameter and the rear lens L2I3 is 30 mm in diameter.

FIG. 12 shows yet another embodiment of the invention which uses a magnifying mirror M12 instead of an objective lens as in the previous embodiments. In this embodiment, mirror M12 is shown located at approximately the same distance from the eye as rear-view mirror M3, and the separation d1''' of the mirror M12 from the eye lens L2I4 is again about 22 inches. Similar to the first embodiment, the power of the mirror and the eye lens are equal and opposite, the mirror being 0.75 Diopters and the eye lens being −0.75 Diopters.

The following table provides a comparison of the some of the various embodiments in terms of focal length, magnification and percentage change in focal length relative to the eye alone (i.e. eye accomodation):

TABLE 3

| example | focal length | magnification | % change |
|---|---|---|---|
| FIG. 5 | 7.11 m | 1.8 | 10% |
| FIG. 7 | 7.11 m | 1.8 | 10% |
| FIG. 11 | 1.39 m | 1.65 | 22% |
| FIG. 12 | 1.02 m | 1.67 | 32% |

Another embodiment, illustrated in FIG. 13A, makes it possible to use the invention with an outside mirror rather than the rear-view mirror on the inside of a vehicle. Such an embodiment is particularly useful when it is impossible to use the rear-view mirror on the inside as for example occurs for many tractor-trailer rigs. In this embodiment, a truck cab 130 has attached thereto a flat outside mirror M4. A concave spherical mirror M6 receives light from mirror M4 and directs it to a negative eye lens L2I5. Light from the negative eye lens is then directed onto an inside rear-view type mirror M5 and back into the driver's eye. Again, the focal lengths of the mirror and the eye lens are maintained approximately equal in magnitude, but opposite in sign. As an example, a power of 0.75 Diopters for the spherical mirror and −0.75 Diopters for the eye lens is useful when used with a separation between the mirror M6 and the eye lens of 22 inches as before.

A similar embodiment is illustrated in FIG. 13B wherein the optical system is brought inside the cab. Similar to previous embodiments, a positive objective lens L1I6 directs light reflected from outside mirror M4 onto a mirror M131 which directs the light toward a negative eye lens L2I6. The negative eye lens then directs the light toward mirror M5 and into the observer's eye.

FIG. 14 depicts a hand-carried magnifier for viewing toward the rear. This imbodiment utilizes the same optics as the embodiment described with respect to FIG. 8. In this embodiment, however, a case 130 has been altered to also hold its own rear-viewing mirror 141 and to incorporate a handle 143. In this embodiment, the viewer can change the magnification simply holding the magnifier at different distances from the eye.

Those skilled in the art will appreciate that there are many equivalent variations of the above invention as well as many uses that have not been described. For example, in the first folded embodiment shown in FIG. 7, a rear-view mirror has been used with the device to look backward as is important to do in a motor vehicle. The folded design is, however, equally as useful for looking in the forward direction with magnification. The folded path makes a convenient size for the apparatus. Further, those skilled in the art will understand that for vehiclar use it may be desirable to attach a rear-view mirror directly to the magnifier case as in the embodiment in FIG. 14 rather than use the rear-view mirror already in the vehicle. Another feature of the invention that has been used in all of the examples is that the focal lengths of the objective element and the eye lens have always been equal in magnitude and opposite in sign. In fact, small variations in the magnitude of the focal length of one element relative to the other (say 10 to 20%) do not appear to seriously erode the visual quality of the images produced. Eye accommodation can be affected slightly, however.

As illustrated in FIG. 15(a), a much more compact optical assembly 195 can be obtained by shortening the focal lengths of the positive and negative lens elements, in this case objective element L1I7 and negative eye lens element L2I7. The positive and negative elements are still of equal but opposite powers (or nearly so, as before), but have much stronger optical powers, and are held in position by a housing 197. This results in a compact assembly less than 3 inches long that does not need to be folded for use in the rear view application with automotive mirrors, and can be mounted relative to the rear view mirror in substantially the same manner as the previous embodiments. FIG. 15(b) shows a typical mounting system 196 for the rear view mirror configuration. In this figure, lens L1I7' is the same as circular lens L1I7 except that it has a square shape (is truncated) in order to cut down on the weight and to provide a pleasing appearance.

In the course of strengthening the optical powers of the elements, it has been found that the optical aberrations are greatly increased. In particular, false color aberration and image distortion are increased. Most of the chromatic aberration is due to the positive element L1I7 and consequently this element was achromatized by forming it of an achromatic doublet in the usual manner well known in the art. In addition, the distortion and all aberrations were minimized by employing computer aided design using the CODE V lens design optimization routine, available from Optical Research Associates of Pasadena, Calif. The general approach was that the aberrations of the positive doublet were balanced (nulled) by opposite contribution imparted by the negative eye lens element. The optical prescription for the optimized assembly is as follows:

| LENS | RADIUS | THICK. | CLEAR DIAM. | GLASS |
|---|---|---|---|---|
| L2I7 | 4.350"CC | 0.12" | 1.60" | SCHOTT BK7 |
|  | 6.500"CC |  | 1.60" |  |
| L1I7(2) | PLANE | 0.16" | 2.50" | SCHOTT F2 |
|  | 9.985"CC |  | 2.50" |  |
| L1I7(1) | 9.985"CX | 0.39" | 2.50" | SCHOTT BK7 |
|  | 3.684"CX |  | 2.50" |  |

The abbreviation "CC" means concave, and "CX" means convex. Lenses L1I7(1) and L1I7(2) form a cemented doublet, and the separation d between lens L1I7 and lens L2I7 is 2.19" (nominal). Schott glass BK7 is code # 517642 and Schott glass F2 is code number 620364.

With this prescription, assuming the eye is located 22" to the left of the negative singlet lens and an overall length of the lens assembly of 72.639 mm (2.86 inches), the system has a 4 degree unvignetted field-of-view, very little distortion (−0.515% at 1.55 degrees from the center of the field), and is color corrected. The actual focal lengths of the positive objective lens and the negative eye lens elements are +124.913 mm and −127.872 mm, respectively. As in the previous embodiments, the optical powers of the positive (doublet) element and negative (singlet) element are approximately equal (to within a few percent) and opposite. Consequently, the positive and negative foci do not coincide at all, even though this design has been adjusted to provide afocal magnification. This afocal design provides better seeing with no need for visual accommodation. The apparent visual magnification of this device when combined with the eye, or other short focal length lens (i.e. camera), is very closely 2.0×, albeit the afocal magnification of the system itself is 1.5×. Further, it is a surprising result that in using this achromatic doublet design, the apparent magnification seems to be much less sensitive to the actual location of the eye relative to the negative eye lens than in systems without the achromat. Those skilled in the art will appreciate that there are many variations of the above systems that are very useful. For example, it can be used as a low power monocular, rather than for viewing in the rear view mirror. Also, it can be made in much higher powers with appropriate lens optimization. Also, it can be made with very large lenses so that one can view a magnified image easily with both eyes. Some other examples are described below.

Shown in FIG. 16 is another embodiment of the invention which is particularly adapted for use as a rifle or hand-gun scope. Similar to the previous embodiment, the system includes a positive achromatic doublet L1I8 and a negative lens L2I8 with approximately equal powers and a separation that is less than the focal length of either lens, and a housing 191 for holding the various optical elements. As in the previous embodiment, the power of the doublet and the negative eye lens has been increased over the earlier embodiments to achieve a short overall length. However, in this embodiment, a reticle 200 has been added which is projected at infinity in the field of view, by means of a reticle projection system 204. The reticle is illuminated with visible light, say having a wavelength LAMDA in the range of 600 to 650 nanometers. The projection system also includes a positive lens LR that is placed at a distance from the reticle that is slightly longer than the focal length of the lens LR. Illumination from the reticle that is received via the lens LR is reflected into the optical path by means of a reflecting system R1. R1 is made up of a folding mirror M7 and a beam combiner (splitter) S1. The light impinging on folding mirror M7 is reflected onto beam combiner (splitter) S1 which is chosen to selectively reflect the wavelengths used to illuminate the reticle and to transmit all others.

The distance of lens LR from the reticle is chosen to be slightly larger than the focal length of lens LR in order to provide a slightly converging beam exiting lens LR. The additional distance is chosen so that the beam is made parallel (afocal) upon exiting the negative lens of the telescope, i.e. the convergence of the beam exiting lens LR is chosen to be balanced by the amount of divergence that will be imparted by the negative focal length lens L2I8. Hence, the observer will see an image of the reticle in the field of view which appears to be at infinity, thereby making it possible to accurately point the telescope at selected targets.

Those skilled in the art will also understand that a reticle could also be projected in the usual way. The reticle can be placed at one focal length distance from the positive lens, with the whole projection assembly placed to one side of the telescope. Then the two beams can be combined on a beam splitter fed from a folding mirror.

FIG. 17(a) shows the embodiment of FIG. 16, hereinafter, scope 203, mounted on the end of a rifle 209, by means of a scope mount 211. As with all rifle scopes, the scope and the rifle need to be properly aligned so that they point in the same direction. This can be performed in the usual manner, and in fact is easier with this scope than with other scopes because of the unusually wide field of view and the large eye accommodation. FIG. 17(b) and FIG. 17(c) show two other locations for the scope which are possible because of the large eye accommodation and small size. Also, if it is desired to use the rifle sights, rather than a projected reticle image inside the scope, in order to aim the rifle, the embodiment 195 of FIG. 15 can also be mounted on the rifle as illustrated in FIGS. 17(a)–17(c). In some instances, however, the height of the rifle sights will need to be adjusted so that they are visible through the scope.

Shown in FIG. 18 is another embodiment of the invention which uses two magnifiers, such as magnifier 195 and an identical magnifier 196, to make a binocular. Here the two magnifiers are connected by a hinge 215 to accommodate eye position. This binocular is far superior to present binoculars on the market in terms of target acquisition, due to the large eye accommodation and the fact that the target is in focus at all distances.

Shown in FIG. 19 is an embodiment 229 of the invention that uses the same optical elements of magnifier 195, but in a folded configuration. Light from an object traverses an achromatic doublet L1I9 and impinges on a mirror M9. The light is reflected from mirror M9 through a negative lens L2I9 and into the observers eye. As in the previous embodiments, the focal lengths of the two lenses are approximately the same, and the distance between the lenses along the optical path is less than the focal length of either lens. A housing 230 provides the structural support necessary to hold the lenses and the mirror in place, as well as providing a protected environment for the optical elements. This embodiment is particularly well adapted for use on large tractor trailer rigs as an outside magnifying mirror.

As an extension of the embodiment shown in FIG. 19, shown in FIG. 20 is an adaptation of this folded compact format that is integrated into an outside truck mirror 235. The truck mirror includes a housing 237, which holds a full-sized mirrored glass 239, and a compact magnifier according to the invention using the same optical elements as embodiment 229. The compact magnifier has an achromatic doublet L1I10 and a negative lens L2I10 and a folding mirror 242 (not shown). In the preferred mode, the compact magnifier is arranged such that it sits on top of mirrored glass 239, although it could be placed elsewhere as well. Since truck mirror 235 is designed to be used outside, it includes a heating element (not shown) inside the housing 237 to prevent condensation on the mirrors. An adjustment screw 244 is also provided in order to adjust the direction of folding mirror 242 and another adjustment screw 246 is provided to adjust the direction of negative lens L1l10. Splash shields, such as splash shield 248, are provided to protect the exposed optical elements.

Shown in FIG. 21 is hand-held version of the compact magnifier using the same optical elements as embodiment 195. A housing 251 for holding the optical elements also includes a handle 253 for quickly picking up the magnifier and holding it up for viewing.

Those skilled in the art will appreciate that there are many other uses and configurations of the apparatus that fall within the purview invention. For example, a higher power system would be useful and could compete very successfully with presently available continuous focus binoculars. Also, the particular lens materials can be varied to change the weight and correction.

What is claimed is:

1. An apparatus for magnifying the appearance of a viewed object, comprising:
    a positive objective lens defining an opto-mechanical axis for the apparatus and having a front focal point located upstream from said positive objective lens;
    a negative eye lens located along the opto-mechanical axis downstream from said positive objective lens, said negative eye lens having a first focal point located between said front focal point and said positive objective lens; and
    housing means for holding said positive objective lens and said negative eye lens.

2. An apparatus as in claim 1 wherein said positive objective lens and said negative eye lens have focal lengths that are substantially equal in magnitude, but opposite in sign.

3. An apparatus as in claim 2 further comprising first flat mirror means for folding said opto-mechanical axis between said objective lens and said eye lens.

4. An apparatus as in claim 3 further comprising second flat mirror means for folding said opto-mechanical axis a second time between said objective lens and said eye lens.

5. An apparatus as in claim 4 wherein said second mirror means and said first mirror means are held in a substantially parallel arrangement with each other along the opto-mechanical axis by said housing means.

6. Apparatus as in claim 1 wherein said positive objective lens is an achromatic doublet.

7. Apparatus as in claim 6 wherein said negative objective lens is a double concave lens.

8. Apparatus as in claim 2 wherein said positive objective lens is an achromatic doublet.

9. Apparatus as in claim 8 wherein said negative objective lens is a double concave lens.

10. Apparatus as in claim 1 further comprising:
    illuminated reticle means for providing an alignment target;
    projection means for projecting an image of said reticle means along a path of light exiting said negative eye lens such that the reticle means appears in the field of view of the apparatus and appears to be located at infinity;
    said housing means for also holding said reticle means and said projection means.

11. Apparatus as in claim 10 wherein said projection means comprises:
    lens means for converging illumination from said reticle means;
    reflecting means for reflecting said illumination from said lens means onto the optical path of said apparatus between said positive lens and said negative eye lens.

12. Apparatus as in claim 11 further comprising mounting means for mounting said housing means to a gun or rifle.

13. Apparatus as in claim 10 further comprising mounting means for mounting said housing means to a gun or rifle.

14. An apparatus for magnifying the appearance of a viewed object, comprising:
    positive optical means defining an opto-mechanical axis for the apparatus and having a positive focal length for converging an incoming bundle of rays of electromagnetic radiation;
    negative optical means along the opto-mechanical axis and separated from said positive optical means by a distance d, said negative optical means having a negative focal length that is substantially equal in magnitude to the focal length of the positive optical means, said negative optical means for receiving said incoming bundle of rays of electromagnetic radiation from said positive optical means;
    said focal length of said positive optical means being greater than d; and
    housing means for holding said positive optical means and said negative optical means.

15. An apparatus as in claim 14 further comprising first flat mirror means for folding said opto-mechanical axis between said positive optical means lens and said negative optical means.

16. An apparatus as in claim 15 further comprising second flat mirror means for folding said opto-mechanical axis a second time between said positive optical means and said negative optical means.

17. An apparatus as in claim 16 wherein said second mirror means and said first mirror means are held in a substantially parallel arrangement with each other along the opto-mechanical axis by said housing means.

18. An apparatus as in claim 14 wherein said positive optical means comprises a meniscus lens having positive power.

19. An apparatus as in claim 14 wherein said negative optical means comprises a meniscus lens having negative power.

20. An apparatus as in claim 14 wherein said positive optical means comprises a mirror having positive power.

21. Apparatus as in claim 14 wherein said positive optical means comprises an achromatic doublet.

22. Apparatus as in claim 21 wherein said negative optical means comprises a double concave lens.

23. Apparatus as in claim 22 further comprising mounting means for mounting said housing means to a gun or rifle.

24. Apparatus as in claim 21 wherein said negative optical means comprises a double concave lens.

25. Apparatus for viewing a magnified image of an object behind a vehicle having a rear-view mirror when said mirror is oriented for the viewer to see said object while facing forward in said vehicle, comprising:
    optical magnifier means for providing a magnified, erect, virtual image of said object;
    connection means attached to said optical magnifier means for holding said optical magnifier means in a relationship relative to said rear-view mirror such that said magnified, erect, virtual image appears to the viewer in said rear-view mirror.

26. An apparatus as in claim 25 wherein said rear-view mirror is located inside said vehicle.

27. Apparatus as in claim 25 wherein said optical magnifier means comprises:
   positive optical means defining an opto-mechanical axis for the apparatus and having a positive focal length for converging an incoming bundle of rays of electromagnetic radiation;
   negative optical means along the opto-mechanical axis and separated from said positive optical means by a distance d, said negative optical means having a negative focal length that is substantially equal in magnitude to the focal length of the positive optical means, said negative optical means for receiving said incoming bundle of rays of electromagnetic radiation from said positive optical means;
   said focal length of said positive optical means being greater than d;
   and housing means for holding said positive optical means and said negative optical means.

28. Apparatus as in claim 27 wherein said positive optical means comprises an achromatic doublet.

29. Apparatus for viewing a magnified image of an object behind a vehicle when a viewer is facing forward in said vehicle, comprising:
   a rear-view mirror attached to the outside of said vehicle and oriented to reflect rays of light recieved from said object;
   optical magnifier means oriented for receiving said reflected rays from said rear-view mirror and for providing a magnified, erect, virtual image of said object;
   reflection means for reflecting said magnified, erect, virtual image toward said viewer; and
   connection means attached to said optical magnifier means for holding said optical magnifier means in a relationship relative to said rear-view mirror so as to receive said reflected rays from said rear-view mirror.

30. Apparatus as in claim 29 wherein said optical magnifier means comprises a concave mirror having a positive optical power for receiving said reflected rays from said rear-view mirror and a negative lens separated from said concave mirror for receiving rays reflected from said concave mirror, said negative lens having an optical power that is substantially equal in magnitude but opposite in sign from said concave mirror, said optical power corresponding to a focal length that is longer than the separation between said concave mirror and said negative lens.

31. Apparatus for viewing a magnified image of an object behind a viewer, comprising:
   a rear-view mirror oriented for the viewer to see said object while facing forward;
   optical magnifier means for providing a magnified, erect, virtual image of said object;
   connection means attached to said optical magnifier means for holding said optical magnifier means in a relationship relative to said rear-view mirror such that said magnified, erect, virtual image appears to the viewer in said rear-view mirror.

32. Apparatus for magnifying the appearance of a viewed object, comprising:
   a positive achromatic doublet lens having an optical axis and a focal length;
   a negative eye lens located downstream from said doublet lens on said optical axis at a distance less than said focal length; and
   holding means for holding said doublet and said negative eye lens.

33. Apparatus as in claim 32 wherein said negative eye lens has a focal length with a magnitude substantially the same as the focal length of the doublet.

34. Apparatus as in claim 33 further comprising folding means for folding said optical axis between said achromatic doublet and said negative lens.

35. Apparatus as in claim 32 further comprising folding means for folding said optical axis;
   said holding means also for holding said folding means.

36. Apparatus as in claim 35 wherein said folding means comprises a plane mirror.

37. Apparatus as in claim 35 further comprising plane mirror means oriented in substantially the same direction as the optical axis of said negative lens;
   said holding means for holding said plane mirror means in proximity of said achromatic doublet lens and said negative lens and for providing an integrated casing for both said lenses and said plane mirror means;
   said plane mirror means for providing a second viewing path independent from said lenses and folding means.

38. Apparatus as in claim 33 wherein said holding means further comprises handle means for manually picking up said holding means.

39. A rear view mirror comprising:
   a positive achromatic doublet lens having an optical axis and a focal length;
   a negative eye lens located downstream from said positive achromatic doublet lens on said optical axis at a distance less than said focal length;
   folding means for folding said optical axis at an acute angle at a location between said positive achromatic doublet lens and said negative eye lens; and
   holding means for holding said positive achromatic doublet lens, said negative eye lens, and said folding means.

40. An apparatus for magnifying the appearance of a viewed object, comprising:
   a positive objective lens defining an opto-mechanical axis for the apparatus and having a front focal point located upstream from said positive objective lens;
   a negative eye lens located along the opto-mechanical axis downstream from said positive objective lens, said negative eye lens having a first focal point located at a point on said opto-mechanical axis that is in a range defined by said front focal point and the back most surface of said objective lens; and
   housing means for holding said positive objective lens and said negative eye lens.

* * * * *